United States Patent
Meguro et al.

(12)

(10) Patent No.: US 6,338,896 B1
(45) Date of Patent: Jan. 15, 2002

(54) MAGNETIC RECORDING MEDIUM

(75) Inventors: Katsuhiko Meguro; Tatsuo Ishikawa; Hiroshi Hashimoto, all of Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/280,004

(22) Filed: Mar. 29, 1999

(30) Foreign Application Priority Data

Mar. 27, 1998 (JP) ............................. 10-081781
Mar. 27, 1998 (JP) ............................. 10-081782

(51) Int. Cl.$^7$ ................................ G11B 5/738
(52) U.S. Cl. ............... 428/323; 428/336; 428/694 SL; 428/694 BS; 428/474.7; 428/900
(58) Field of Search ................ 428/323, 336, 428/694 SL, 694 BS, 474.7, 900

(56) References Cited

U.S. PATENT DOCUMENTS

| | | | | |
|---|---|---|---|---|
| 4,275,113 A | * | 6/1981 | Saito et al. ............... | 428/323 |
| 4,308,311 A | * | 12/1981 | Ogawa et al. ............. | 428/215 |
| 4,511,617 A | * | 4/1985 | Hideyama et al. ......... | 428/212 |
| 5,336,559 A | * | 8/1994 | Yamagishi et al. ........ | 428/329 |
| 5,686,166 A | * | 11/1997 | Tsukuda et al. ........... | 428/141 |
| 5,993,938 A | * | 11/1999 | Tsukuda et al. ........... | 428/141 |

* cited by examiner

*Primary Examiner*—Stevan A. Resan
(74) *Attorney, Agent, or Firm*—Sughrue, Mion, Zinn, Macpeak & Seas, PLLC

(57) ABSTRACT

The present invention provides a magnetic recording medium, which comprises a magnetic layer having ferromagnetic powder dispersed in a binder on a non-magnetic support member, wherein the non-magnetic support member is made of aromatic polyamide, an undercoating layer is provided between said non-magnetic support member and a lower non-magnetic layer, or between the non-magnetic support member and the magnetic layer, said undercoating layer comprising polyamide resin having tertiary amino group and containing repeated structural units expressed by the following formulae (1) and (2).

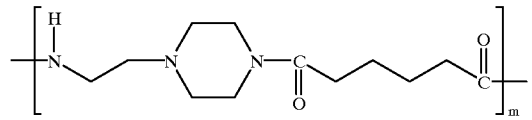

(1)

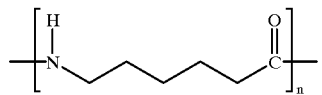

(2)

11 Claims, No Drawings

MAGNETIC RECORDING MEDIUM

BACKGROUND OF THE INVENTION

The present invention relates to a magnetic recording medium, which comprises a magnetic layer having ferromagnetic powder dispersed in a binder and being placed at least on one side of a non-magnetic support member, or which comprises a non-magnetic coating layer having non-magnetic powder dispersed in a binder, and a magnetic layer is further provided on a non-magnetic support member. The magnetic recording medium has high electromagnetic transfer characteristics, high adhesion property and good running durability.

In general, in a magnetic recording medium used for audio, video or computer applications, a magnetic layer with ferromagnetic powder dispersed in a binder is provided on a non-magnetic support member, or a non-magnetic coating layer with non-magnetic powder dispersed in a binder is placed on a non-magnetic support member, and a magnetic layer with ferromagnetic powder dispersed in a binder is further placed on the non-magnetic coating layer.

In recent years, technical development has been made in the field of magnetic recording from conventional analog recording toward application of digital recording with less possibility of recording deterioration. Generally, it is necessary to record more signals in digital recording than in analog recording. Also, higher picture quality and higher tone quality are required for the recording and reproducing apparatus and for the recording medium to be used than in analog recording. Also, there are higher demands on more compact design and space-saving than in analog recording. This means that it is necessary to achieve the recording with higher density.

To attain the high density recording, it is necessary to have recording signals with shorter wavelength or narrower recording tracks. For this purpose, it is necessary to have finer ferromagnetic powder, filling at higher density and ultra-smoothening of medium surface. At the same time, writing speed or reading speed on the recording medium must be increased. For this reason, it is attempted to improve the number of revolutions of cylinder or to improve carrier speed of magnetic tape. Further, there are demands to produce thinner recording medium in order to improve volume density.

In the past, polyethylene terephthalate (PET), polyethylene-2,6-naphthalate (PEN), etc. have been used as the non-magnetic support member. With the development of thinner magnetic recording medium, it is now difficult to run magnetic tape at the tape/head relative speed of 20 m/sec. or higher in stable manner on a small diameter head, which is rotated at high speed of 5,400 to 9,000 rpm, and there is a tendency that Rf output is decreased and output fluctuation is increased. In the decrease of Rf output and output fluctuation, there are problems such as moving or drawing of the recording medium toward head chip mounting window of cylinder head. This means that the contact between the recording medium and head becomes uneven and gap is generated between them. This leads to loss during recording and reproducing and causes the output decrease or the output fluctuation.

In the so-called head-hitting as described above, it is known that stiffness of the recording medium in lateral direction contributes more than that of longitudinal direction. The stiffness M is expressed by: $M = Ebd^3/12$, where E is Young's modulus, b is width of magnetic tape, and d is thickness of magnetic tape. To increase the stiffness in lateral direction, it is effective to increase Young's modulus in lateral direction of the support member by the increase of the percent of stretch in case the thickness is constant. In case thinner recording medium is used, it is no more possible to maintain the stiffness of the recording medium in optimal range merely by increasing the percent of stretch.

In this respect, aromatic polyamide (aramide) has been proposed. When a magnetic recording medium was prepared using an aromatic polyamide support member, adhesion between the non-magnetic support member and the magnetic layer or the non-magnetic coating layer was not sufficient. During running operation, the magnetic layer was often stripped off or dropped off from edge portion due to sliding or friction with the head-running system and this caused dropout or contamination of the running system.

The present applicants have proposed the use of amorphous linear saturated polyester or polyester elastomer as an undercoating agent for polyamide substrate film in JP-B-82042890 and JP-B-82042891. Also, in U.S. Pat. No. 4,308,311, it has been proposed to use an aromatic polyamide with higher Young's modulus as substrate film and the use of alcohol-soluble polyamide as an undercoating agent. However, this was not satisfactory in the adhesive property, and surface property of the magnetic layer was also not sufficient. Further, in JP-A-0729148, a magnetic recording medium has been proposed, which comprises a polyamide undercoating layer on a support member of polyamide film, and there are demands on a magnetic recording medium with smooth undercoating layer with the polyamide film support member and the magnetic layer with high adhesive property.

It is an object of the present invention to provide a magnetic recording medium, which comprises a non-magnetic coating layer having non-magnetic powder dispersed in a binder and being coated on a non-magnetic support member, and a magnetic layer is further placed on it, whereby the magnetic recording medium provides high adhesion between the non-magnetic layer and the non-magnetic support member, has good running durability and good head contact on a recording and reproducing system even when an aramide support member is used, and further has high volume recording density and magnetic layer with good smoothness and high electromagnetic transfer characteristics.

SUMMARY OF THE INVENTION

To attain the above object, the magnetic recording medium according to the present invention comprises a non-magnetic coating layer having non-magnetic powder dispersed in a binder, the non-magnetic coating layer being placed at least on one side of a non-magnetic support member, there is further provided a magnetic layer having ferromagnetic powder dispersed in a binder and being placed on the non-magnetic coating layer, whereby the non-magnetic support member is made of aromatic polyamide, the binder in the lower non-magnetic layer comprises at least one type selected from —SO$_3$M, —OSO$_3$M, —PO$_3$M$_2$, or —OPO$_3$M$_2$, and an undercoating layer comprising polyamide having tertiary amino group is provided between the non-magnetic support member and the lower non-magnetic layer.

The present invention also provides a magnetic recording medium as described above, wherein the polyamide having the tertiary amino group is not soluble in a solvent which is used in the lower non-magnetic layer to be coated after coating of the undercoating layer.

The present invention provides a magnetic recording medium as described above, wherein the polyamide resin having the tertiary amino group is a copolymerized polyamide containing repeating structural units represented by the following formulae (1) and (2) respectively:

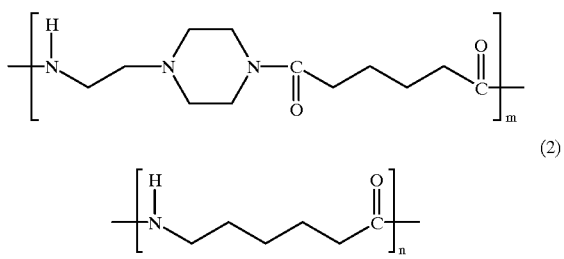

Further, the present invention provides a magnetic recording medium, which comprises a magnetic layer having ferromagnetic powder dispersed in a binder and being placed at least on one side of a non-magnetic support member, or a non-magnetic coating layer having non-magnetic powder dispersed in a binder and a magnetic layer having ferromagnetic powder dispersed in a binder and being placed on the non-magnetic coating layer, whereby the non-magnetic support member is made of aromatic polyamide, an undercoating layer is provided between the non-magnetic support member and the lower non-magnetic layer, or in case the lower non-magnetic layer is not present, between the non-magnetic support member and the magnetic layer, the undercoating layer comprising polyamide resin having tertiary amino group and containing repeated structural units expressed by the following formulae (1) and (2) in a copolymerization ratio (molar ratio) of 75/25 to 95/5.

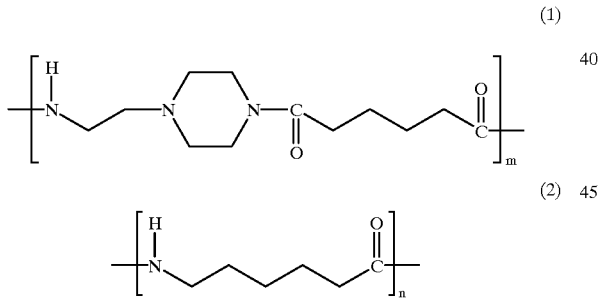

Also, the present invention provides a magnetic recording medium as described above, wherein the polyamide resin having the tertiary amino group has glass transition temperature (Tg) of not lower than 15° C.

Further, the present invention provides a magnetic recording medium as described above, wherein the undercoating layer has a thickness of 0.03 to 1.0 μm.

DESCRIPTION OF THE PREFERRED EMBODIMENT

In the past, when polyamide film of aromatic polyamide film was used as a support member and an undercoating layer was provided such as amorphous linear saturated polyester resin and vinylidene chloride acrylonitrile copolymer polyurethane elastomer, alcohol-soluble polyamide resin, etc., it was not possible to prevent contamination of dropout-running system due to peeling off or dropping off of the magnetic layer and the non-magnetic layer caused by the decrease of adhesion property when a thinner tape is used.

Also, when the magnetic layer or the non-magnetic layer is coated after coating of the undercoating layer, it has been found that, if the undercoating layer is swollen or dissolved due to the solvent used in the magnetic layer or the non-magnetic layer, the surface of the undercoating layer becomes coarse during re-drying, and the surface of the magnetic layer becomes coarse, and this aggravates the electromagnetic transfer characteristics.

After making fervent efforts to solve the above problems, the present inventors have found that the problems can be solved by the following magnetic recording medium: This magnetic recording medium comprises a magnetic layer having ferromagnetic powder dispersed in a binder, and the magnetic layer is placed at least on one side of a non-magnetic support member, or a non-magnetic coating layer having non-magnetic powder dispersed in a binder is disposed, and a magnetic layer having ferromagnetic powder dispersed in a binder is placed on it, whereby the non-magnetic support member is made of aromatic polyamide, and an undercoating layer having polyamide resin containing tertiary amino group as main component is provided between the non-magnetic support member and the lower non-magnetic layer, or in case the lower non-magnetic layer is not present, between the non-magnetic support member and the magnetic layer.

Further, the present inventors have found it preferable to provide an undercoating layer, which has polyamide resin having tertiary group as main component and having repeating structural units given by the following formulae (1) and (2) in a copolymerization ratio of 75/25 to 95/5 in molar ratio.

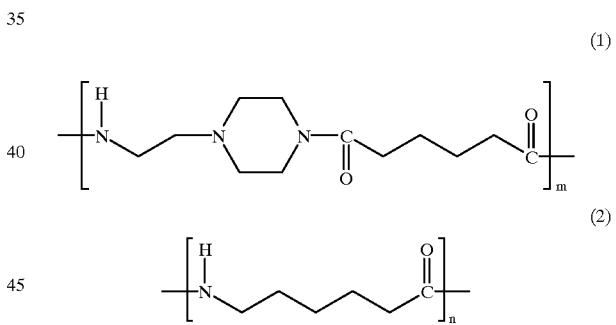

The method to synthesize the polyamide resin used in the present invention is described in the following publications and the patent specifications: Lectures on Plastic Materials (16) "Polyamide Resin" (compiled by O. Fukumoto; published by Nikkan Kogyo Shimbun); "Synthetic Macromolecule V" (published by Asakura Shoten,; compiled by Murahashi, Imoto, and Tani); U.S. Pat. Nos. 2,130,497; 2,130,523; 2,149,273; 2,158,064; 2,223,403; 2,249,627; 2,534,347; 2,540,352; 2,715,620; 2,756,221; 2,939,862; 2,994,693; 3,012,994; 3,133,956; 3,188,228; 3,193,475; 3,193,483; 3,197,443; 3,226,362; 3,242,134; 3,247,167; 3,299,009; 3,328,352; and 3,354,123.

Regarding the tertiary amino group, it may be contained in side chain or in main chain, while it is preferable to be contained in main chain.

To introduce it to side chain, poly ε-caproamide having tertiary amino group on side chain is used. To introduce it to main chain, bis-(aminopropyl)-piperazine, 1-(2-aminoethyl)-piperazine, etc. may be used.

As the diamines to be used in the present invention, the following compounds may be used: hydrazine, methylenediamine, ethylenediamine, trimethylenediamine, tetramethylenediamine, pentamethylenediamine, hexamethylenediamine, heptamethylenediamine, octamethylenediamine, nonamethylenediamine, decamethylenediamine, diaminocyclohexane, di-(aminomethyl)-cyclohexane, bis-(4-aminocyclohexyl)-methane, bis-(4-amino-3,5-methylcyclohexyl)-methane, o-phenylenediamine, m-phenylenediamine, p-phenylenediamine, 4,4'-diaminobiphenyl, tolylenediamine, xylenediamine, naphthylenediamine, bis-(aminomethyl)-piperazine, bis-(aminoethyl)-piperazine, bis-(aminoethyl)-piperazine, bis-(aminopropyl)-piperazine, 1-(2-aminomethyl)-piperazine, 1-(2-aminoethyl)-piperazine, 1-(2-aminopropyl)-piperazine, etc.

As dicarboxylic acids, the following compounds may be used: oxalic acid, malonic acid, succinic acid, glutaric acid, adipic acid, pimelic acid, azelaic acid, cebacic acid, phthalic acid, isophthalic acid, terephthalic acid, maleic acid anhydride, phthalic acid anhydride, etc.

As the lactams, α-pyrolidone, α-piperidone, γ-butyrolactam, δ-valerolactam, ε-caprolactam, ω-capryllactam, ω-laurolactam, etc. may be used.

Above all, it is more preferable to use the following compounds because of hygroscopic property, glass transition temperature (Tg), solubility in solvents, etc.: the polymer obtained by combination of 2-aminoethyl-piperazine as the material of the polyamide resin having tertiary amino group, adipic acid as the dicarboxylic acid, and ε-capryllactam as the lactam.

As the polyamide resin used in the present invention, the compound showing solubility in the solvents and having various compositions as described above is used. In particular, it is preferable to use the substance, which is not soluble in the solvent used in the magnetic layer or the non-magnetic layer.

The content of the tertiary amino group in the polyamide resin used in the present invention is preferably in the range of $0.5 \times 10^{-3}$ eq/g to $10 \times 10^{-3}$ eq/g, or more preferably in the range of 2.5 to $5 \times 10^{-3}$ eq/g.

If it is less than $0.5 \times 10^{-3}$ eq/g, adhesive property cannot be maintained. If it is higher than $10 \times 10^{-3}$ eq/g, the undercoating agent is exposed on the end surface of the magnetic recording medium influenced by humidity in the air and becomes sticky. Thus, blocking occurs on the end surface due to the increase of hygroscopic property.

The glass transition temperature (Tg) of the polyamide resin used in the present invention is preferably between 0° C.–120° C., or more preferably between 10° C.–80° C. If it is lower than 0° C., blocking occurs on the end surface. If it is higher than 120° C., internal stress in the undercoating layer is not relieved. As a result, the adhesive property cannot be maintained.

Molecular weight of the polyamide resin used in the present invention is preferably 400 to 100,000 in weight average molecular weight, or more preferably 1,000 to 50,000. If it is lower than 400, blocking occurs on the end surface. If weight average molecular weight is higher than 100,000, solubility in solvent decreases, and this causes trouble in the coating of the undercoating layer.

The undercoating layer in the present invention has preferably thickness of 0.03 to 1.0 μm, or more preferably 0.05 to 0.8 μm. If it is thinner than 0.03 μm, adhesive property cannot be maintained, and the coating layer may be dropped off, and this causes the increase of dropouts. If it is thicker than 1.0 μm, adhesive property can be maintained, while the entire magnetic recording medium becomes too thick, and this is disadvantageous in the production of thinner products.

As the aromatic polyamide resin used in the present invention, the following compounds may be used: polyamide resin, having one type or more of chemical bonding of terephthalhydrazide, parabenzamide, paraphenylene phthalamide as main structural unit. Paraphenylene terephthalamide has high molecular rigidity and also has high molecular regularity and symmetry, and this leads to higher Young's modulus in the support member produced.

Weight average molecular weight of the aromatic polyamide resin is preferably 10,000 to 100,000, or more preferably 30,000 to 50,000. If molecular weight is lower than 10,000, Young's modulus is too low. If it is more than 100,000, the product has poor workability in molding.

These aromatic polyamide resins are processed by melt molding or solution molding, and the support member thus obtained has thickness of 2 to 80 μm, or more preferably 3 to 10 μm. Maximum surface roughness (Rmax) of the support member thus prepared is preferably lower than 0.1 μm [JIS B0601 (1976); ASA B46-1 (1962)] because this minimizes the noise of the magnetic recording medium prepared.

The non-magnetic support member in the magnetic recording medium of the present invention has preferably thickness of 3 to 80 μm.

If ferromagnetic metal powder containing iron, cobalt, or nickel is used as the ferromagnetic powder in the present invention, remarkable effect can be attained. It is preferable to use ferromagnetic metal powder such as α—Fe, Co, Ni, Fe—Co alloy, Fe—Co—Ni alloy, Fe—Co—Ni—P alloy, Fe—Co—Ni—B alloy, Fe—Ni—Zn alloy, Ni—Co alloy, Co—Ni—Fe alloy, etc.

There is no special restriction on the shape of the ferromagnetic metal powder. Normally, metal powder in needle-like shape, granular shape, cubic shape, grain-like shape or planar shape may be used. In case of needle-like shape, particle size in longer axis length is preferably 0.05 to 0.5 μm, or more preferably 0.05 to 0.3 μm, or most preferably 0.10 to 0.25 μm. The ratio of longer axis to shorter axis is 2/1 to 25/1, or more preferably 3/1 to 15/1, or most preferably 4/1 to 12/1. In case of planar shape, diameter of the plane area is 0.02 to 0.20 μm, or more preferably 0.03 to 0.10 μm, or most preferably 0.04 to 0.07 μm. The ratio of plane diameter to plane thickness is 1/1 to 30/1, or more preferably 2/1 to 10/1, or most preferably 2.5 to 7/1.

Specific surface area ($S_{BET}$) of the ferromagnetic metal powder is 47 to 80 m$^2$/g, or more preferably 53 to 70 m$^2$/g. Coercive force (Hc) is 1250 to 2500 Oe, saturation magnetization (δS) is 100 to 180 emu/g, or more preferably 110 to 150 emu/g. Moisture content is preferably 0.1 to 2.0 weight %, and pH value is preferably 3 to 11 (5 g of ferromagnetic powder/100 g of water). On the surface of the ferromagnetic metal powder, rust-preventive agent, surface treatment agent, dispersant, lubricant, antistatic agent, etc. as described later may be attached by impregnating in solvent prior to dispersion.

As the ferromagnetic metal powder, the following alloy, iron nitride, or iron carbide may be used: That is, the metal powder preferably has metal components of more than 60 weight %, and more than 70 weight % of the metal components is least one type of ferromagnetic metal powder or alloy of (e.g. Fe, Fe—Co, Fe—Co—Ni, Co, N, Fe—Ni, Co—Ni, or Co—Ni—Fe). The metal powder may contain other components (e.g. Al, Si, S, Sc, Ti, V, Cr, Mn, Cu, Zn, Y, Mo, Rh, Pd, Ag, Sn, Sb, Te, Ba, Ta, W, Re, Au, Pb, Bi, La, Ce, Pr, Nd, B, or P) in the range of less than 40 weight %, or more preferably less than 20 weight %. In particular, to reinforce the strength of the metallic iron, it is preferable to use Al, Si or Cr alone or in combination in the surface layer. Also, the ferromagnetic metal powder may contain small quantity of hydroxides or oxides, alkali metal elements (such as Na, K), or alkali earth metal elements (such as Mg, Ca, Sr). The method to manufacture the above ferromagnetic metal powder is already known in the art, and typical examples of the ferromagnetic metal powder used in the present invention can be manufactured according to the methods already known.

In particular, the following methods may be used to manufacture the ferromagnetic alloy powder used as the ferromagnetic powder in the present invention:

(a) Method to reduce complex organic acid salt (primarily, oxalic acid salt) using reducing gas such as hydrogen.

(b) Method to obtain Fe or Fe—Co particles by reducing iron oxide using reducing gas such as hydrogen.

(c) Method to thermally decompose metal carbonyl compound.

(d) Method to reduce by adding reducing agent such as sodium borohydride, hypophosphite, or hydrazine to aqueous solution of ferromagnetic metal.

(e) Method to deposit ferromagnetic metal powder by electrolysis using mercury cathode and then by separating from mercury.

(f) Method to obtain fine powder by evaporating metal in inert gas under low pressure.

As the ferromagnetic powder used in the present invention, barium ferrite in planar hexagonal system may be used. Particle size of the barium ferrite is 0.001 to 1 micron in diameter, and the thickness is ½ to 1/20 of the diameter. Specific gravity of barium ferrite is 4 to 6 g/cc, and specific surface area is 1 to 70 $m^2/g$.

Also, FeOx (x=1.33 to 1.50), Co-containing FeOx, etc. may be used. As the resin component of the binder used in the magnetic layer and the back coating layer of the present invention, resins already known in the art such as thermoplastic resin, thermosetting resin, reactive type resin, electron beam curing resin, ultraviolet curing resin, visible light curing resin, etc. or mixture of these resins may be used.

The thermoplastic resin used in the present invention has preferably softening temperature of not more than 150° C., number average molecular weight of 10,000 to 300,000, and polymerization degree of about 50 to 2,000, or more preferably about 200 to 600. For example, the following types of thermoplastic resin or mixture of these resins may be used: Vinyl chloride-vinyl acetate copolymer, vinyl chloride polymer, vinyl chloride-vinyl acetate vinyl alcohol copolymer, vinyl chloride-vinylidene chloride copolymer, vinyl chloride-acrylonitrile copolymer, acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, urethane elastomer, nylon-silicone type resin, nitrocellulose-polyamide resin, vinyl polyfluoride, vinylidene chloride-acrylonitrile copolymer, butadiene-acrylonitrile copolymer, polyamide resin, polyvinylbutyral, cellulose derivatives (cellulose acetate butyrate, cellulose diacetate, cellulose triacetate, cellulose propionate, nitrocellulose, ethyl cellulose, methyl cellulose, propyl cellulose, methylethyl cellulose, carboxymethyl cellulose, acetyl cellulose, etc.), styrene-butadiene copolymer, polyester resin, polycarbonate resin, chlorovinylether-acrylic acid ester copolymer, amino resin, thermoplastic resin of synthetic rubber type, and mixture of these resins.

The thermosetting resin or reactive type resin used in the present invention is preferably not more than 200,000 in weight average molecular weight in the state of coating solution, and when it is coated and dried and is then heated and humidified, molecular weight will become infinite due to reaction such as condensation, addition reaction, etc. Among these resins, it is preferable to use the resin, which is not softened or melted until it is thermally decomposed. More concretely, the following resins may be used: phenol resin, phenoxy resin, epoxy resin, polyurethane resin, polyester resin, polyurethane polycarbonate resin, urea resin, melamine resin, alkyd resin, silicone resin, acryl type reactive resin (electron beam curing resin), epoxy-polyamide resin, nitrocellulose melamine resin, mixture of high molecular polyester resin and isocyanate prepolymer, mixture of methacrylate copolymer and diisocyanate prepolymer, mixture of polyester polyol and polyisocyanate, urea formaldehyde resin, mixture of low molecular glycol, high molecular diol and triphenylmethane triisocyanate, polyamine resin, polyimine resin, and mixture of these resins.

It is preferable that these thermoplastic resins, thermosetting resins and reactive type resins contain, in addition to principal functional groups, one to six types of the following functional groups: acidic group of carboxylic acid (COOM), sulfinic acid, sulfenic acid, sulfonic acid ($SO_3M$), phosphoric acid (PO(OM)(OM)), phosphonic acid, sulfuric acid ($OSO_3M$), and ester group of these acids (where M represents hydrogen, alkali metal, alkali earth metal or hydrocarbon group), amino acids, aminosulfonic acids, sulfuric acid ester or phosphoric acid ester of amino alcohol, ampholytic groups such as alkylbetaine, amino group, imino group, imide group, amide group, hydroxyl group, alkoxyl group, thiol group, alkylthio group, halogen group (F, Cl, Br and I), silyl group, siloxane group, epoxy group, isocyanate group, cyano group, nitrile group, oxo group, acryl group, phosphine group, etc. It is preferable that each of these functional groups is contained in an mount of $1\times10^{-6}$ to $1\times10^{-2}$ equivalent per 1 g of resin.

As the curing agent, polyisocyanate compound is normally used. As the polyisocyanate compound to be used at least in one of the magnetic layer or the back coating layer of the present invention, the following compounds may be used: isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, isophorone diisocyanate, products of the diisocyanate and polyalcohol, polyisocyanate of dimer to decamer produced by condensation of the isocyanates, or product of triisocyanate and polyurethane and having terminal functional group. Weight average molecular weight of these polyisocyanates is preferably in the range of 100 to 20,000.

As concrete examples of these polyisocyanate compounds, there are Coronate L, Coronate HL, Coronate 2030, Coronate 3031, Millionate MR, and Millionate MTL (manufactured by Nippon Polyurethane Industry Co., Ltd.), Takenate D-102, Takenate D-110N, Takenate D-200, Takenate D-202, Takenate 300S, and Takenate 500 (manufactured by Takeda Chemical Industries Ltd.), Sumidule T-80, Sumidule 44S, Sumidule PF, Sumidule L, Sumidule N, Desmodule L, Desmodule IL, Desmodule N, Desmodule HL, Desmodule T65, Desmodule 15, Desmodule R, Desmodule RF, Desmodule SL, and Desmodule Z4273 (manufactured by Sumitomo Bayer. These compounds may be used alone or in combination by utilizing the difference of curing reactivity. With the purpose of enhancing curing reaction, the compound having hydroxyl group (butanediol, hexanediol, polyurethane having weight average molecular weight of 1,000 to 10,000, water, etc.), amino group (monomethylamine, dimethylamine, trimethylamine, etc.) or metal oxide may be used as catalyst. It is preferable that these compounds having hydroxyl group or amino group is multi-functional. These polyisocyanates are preferably used in 2 to 70 weight parts to 100 weight parts of total quantity of polyisocyanates and binder resin in both the magnetic layer and the backing layer, or more preferably in 5 to 50 weight parts. The examples of these compounds are described JP-A-60-131622, JP-A-61-74138, etc.

These binders are used alone or in combination, and additive may be added. Mixing ratio of ferromagnetic powder and binder in the magnetic layer is: 5 to 300 weight parts of binder to 100 weight parts of ferromagnetic powder. Mixing ratio of powder to binder in the backing layer is: 8 to 400 weight parts of binder to 100 weight parts of powder. As the additives, carbon black, abrasives, lubricant, dispersant, dispersion aid, fungicide, antistatic agent, oxidation inhibitor, solvent, etc. may be added.

As the carbon black to be used in the magnetic layer and the backing layer of the present invention, furnace black for rubber, thermal black for rubber, carbon black for color, acetylene black, etc. may be used. These types of carbon black are used for the purpose of improving antistatic effect, light shielding effect, friction coefficient adjusting effect, or durability improving effect. Abbreviations for the products of these types of carbon black used in U.S.A. are: SAF, ISAF, IISAF, T, HAF, SPF, FF, FEF, HMF, GRF, APF, SRF, MPF, ECF, SCF, CF, FT, MT, HCC, HCF, MCF, LFF, RCF, etc. The products classified in ASTM standards D-1765-82a may be used. These types of carbon black used in the present invention preferably have average particle size of 5 to 1,000 nm (electron microscope method), specific surface area of 1 to 800 $m^2/g$ based on nitrogen adsorption method, pH value of 4 to 11 (JIS K-6221-1982), and dibutyl phthalate (DBP) oil absorption of 10 to 800 ml/100 g (JIS K-6221-1982). In the size of carbon black in the present invention, carbon black of 5 to 100 nm may be used with the purpose of reducing surface electric resistance of coating film, and the carbon black of 50 to 1,000 may be used for the purpose of controlling strength of the coating film. Also, with the purpose of controlling surface roughness of the coating film, carbon black of fine particle size (less than 100 nm) may be used for smoothening to reduce spacing loss. Further, with the purpose of having rough surface and having lower friction coefficient, carbon black of coarser particle size (100 nm or more) may be used. As described above, types and quantity to be added of the carbon black vary according to the purpose required for the magnetic recording medium.

On these types of carbon black, surface treatment may be performed using dispersant (to be described later) or may be used by turning to graphite using resin. The furnace temperature may be set to 2000° C. or more during the manufacture of carbon black, and a part of the surface may be turned to graphite and used. As a special type of carbon black, hollow carbon black may be used.

It is preferable that this carbon black is used in 0.1 to 30 weight parts to 100 weight parts of ferromagnetic powder in case of the magnetic layer. In case of the back coating layer, it is preferable to use it in 20 to 400 weight parts to 100 weight parts of the resin. For the detailed information on the carbon black to be used in the present invention, reference may be made to: "Carbon Black Handbook", compiled by Carbon Black Association of Japan (published in 1995), for example.

The abrasive agent in the magnetic layer or the back coating layer of the present invention is used to improve durability of the magnetic recording medium or to increase head cleaning effect of video tape recorder. In general, the following material having abrasive effect or anti-friction effect may be used: α-alumina, γ-alumina, α, γ-alumina, fused alumina, silicon carbide, chromium oxide, cerium oxide, corundum, artificial diamond, α-iron oxide, garnet, emery, silica rock, silicon nitride, boron nitride, molybdenum carbide, boron carbide, tungsten carbide, titanium carbide, quartz, tripoli, diatomaceous earth, dolomite, etc. These materials have preferably Mohs hardness of 6 or more, or more preferably 8 or more, and these are used in combination of one to four different types. The abrasive agent is preferably 0.005 to 5 μm in average particle size, or more preferably 0.01 to 2 μm. These abrasive agents are added in the range of 0.01 to 20 weight parts to 100 weight parts of ferromagnetic powder in case of the magnetic layer. In case of the back coating layer, it is preferable to use the abrasive agent in the range of 0.01 to 5 weight parts to 100 weight parts of the resin to be described later. As concrete examples, the following products may be used: AKP1, AKP15, AKP20, AKP30, AKP50, AKP80, Hit 50, Hit 100, etc. (manufactured by Sumitomo Chemical Co., Ltd.) These products are described in JP-B-52-28642 and other patent publications.

As the powder lubricant used in the magnetic layer or the back coating layer of the present invention, the following materials may be used: inorganic fine powder such as graphite, molybdenum disulfide, boron nitride, graphite fluoride, calcium carbonate, barium sulfate, silicon oxide, titanium oxide, zinc oxide, tin oxide, tungsten disulfide, etc., resin fine powder such as acrylstyrene type resin powder, benzoguanamine type resin powder, melamine type resin powder, polyolefin type resin powder, polyester type resin powder, polyamide type resin powder, polyimide type resin powder, polyfluoroethylene type resin powder, etc.

As the lubricant of organic compound type, the following compounds may be used: Compounds with fluorine or silicon introduced therein such as silicone oil (dialkyl polysiloxane, dialkoxy polysiloxane, phenyl polysiloxane, fluoroalkyl polysiloxane (KF96, KF69, etc.; manufactured by Shin-Etsu Chemical Co., Ltd.), fatty acid denatured silicone oil, fluorine alcohol, polyolefin (such as polyethylene wax, polypropylene, etc.), polyglycol (ethylene glycol, polyethylene oxide wax, etc.), tetrafluoroethylene oxide wax, polytetrafluoro glycol, perfluoroalkyl ether, perfluoro fatty acid, perfluoro fatty acid ester, perfluoro-alkyl sulfuric acid ester, perfluoro-alkyl sulfonic acid ester, perfluoroalkylbenzene sulfonic acid ester, perfluoroalkyl phosphoric acid ester, etc., organic acid and organic acid ester compounds such as alkyl sulfuric acid ester, alkyl sulfonic acid ester, alkyl phosphonic acid triester, alkylphosphonic acid monoester, alkylphosphonic acid diester, alkyl-phosphoric acid ester, succinic acid ester, etc., heterocyclic compounds containing nitrogen and sulfur such as triazaintolidine, tetraazaindene, benzotriazole, benzodiazole, EDTA, etc., fatty acid esters comprising monobasic fatty acid having 10 to 40 carbon atoms and one or more of monohydric, dihydric, trihydric, tetrahydric, or hexahydric alcohol having 2 to 40 carbon atoms, fatty acid esters comprising monobasic fatty acid having 10 or more carbon atoms and monohydric to hexahydric alcohol having total number of 11–70 carbon atoms (when combined with carbon atoms of the monobasic fatty acid), fatty acids or fatty acid amides having 8 to 40 carbon atoms fatty acid alkyl amides, aliphatic alcohols, etc. may be used.

As concrete examples of these compounds, there are butyl caprylate, octyl caprylate, ethyl laurate, butyl laurate, octyl laurate ethyl myristate, butyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, stearic acid amide, stearic acid alkylamide, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, carnauba wax, etc. These may be used alone or in combination.

As the lubricants used in the present invention, lubricant additives may be used alone or in combination. These include oxidation inhibitors known as rust preventive agents (metal chelating agent such as alkylphenol, benzotriazine, tetraazaindene, sulfamide, guanidine, nucleic acid, pyridine, amine, hydroquinone, EDTA, etc.), rust preventive agents (such as naphthenic acid, alkenyl succinic acid, phosphoric acid, dilauryl phosphate, etc.), oily agents (rape seed oil, lauryl alcohol, etc.), extreme pressure agents (such as dibenzyl sulfide, tricresyl phosphate, tributyl phosphite, etc.), detergent-dispersant, viscosity index improver, pour point depressant, defoaming agent, etc. These lubricants are added in the range of 0.01 to 30 weight parts to 100 weight parts of binder.

As the dispersant or dispersion aid used in the present invention, the following compounds may be used: fatty acids containing 2 to 40 carbon atoms such as caprylic acid, capric acid, lauric acid, myristic acid, palmitic acid, stearic acid, oleic acid, elaidic acid, linoleic acid, linolenic acid, stearoleic acid, behenic acid, maleic acid, phthalic acid, ($R^1COOH$; $R^1$ represents alkyl group, phenyl group, or aralkyl group having 1 to 39 carbon atoms), metal soap containing alkali metal (Li, Na, K, etc.) or alkali earth metal (Mg, Ca, Ba, etc.) of the above fatty acid, $NH_4^+$, Cu, Pb, etc., (copper oleate), fatty acid amide, lecithin (soybean oil lecithin), etc. In addition, higher alcohols having 4 to 40 carbon atoms (such as butanol, octyl alcohol, myristyl alcohol, stearyl alcohol), and sulfuric acid ester of these compounds, sulfonic acid, phenyl sulfonic acid, alkyl sulfonic acid, sulfonic acid ester, phosphoric acid monoester, phosphoric acid diester, phosphoric acid triester, alkyl phosphonic acid, phenyl phosphonic acid, amine compounds etc. may also be used. Further, polyethylene glycol, polyethylene oxide, sulfosuccinic acid, metal salt of sulfosuccinic acid, sulfosuccinic acid ester, etc. may be used. Normally, one or more types of dispersants are used, and one type of dispersant is added in the range of 0.005 to 20 weight parts to 100 weight parts of binder. To use these dispersants, these may be attached to the surface of the ferromagnetic powder or non-magnetic powder in advance or these may be added in the course of dispersion. These substances are described in JP-B-6428369, JP-B-7917945, JP-B-7315001, U.S. Pat. No. 3,387,993, U.S. Pat. No. 3,470,021, etc.

As the fungicides used in the present invention, there are 2-(4-thiazolyl)-benzimidazol, N-(fluorodichloromethylthio)-phthalimide, 10,10'-oxybisphenoxysalsine, 2,4,5,6-tetrachloroisophthalonitrile, P-triiode-methylsulfone, triiode-allyl alcohol, dihydroaceto acid, phenyl oleate mercury, bis-(tributyl tin) oxide, salicylanilide, etc.

These compounds are described, for example, in: "Microorganism Calamity and Preventive Technique", Kogaku Tosho, 1972; "Chemistry and Industry", 32,904 (1979), etc. As antistatic agents used in the present invention in addition to carbon black, the following compounds are used: conductive powder such as graphite, denatured graphite, carbon black graphite polymer, tin oxide-antimony oxide, tin oxide, titanium oxide-tin oxide-antimony oxide, etc., natural surface active agents such as saponin, nonionic surface active agents such as alkylene oxide type, glycerin type, glycidol type, polyhydric alcohol, polyhydric alcohol ester, alkylphenol EO addition product, etc., cationic surface active agent such as higher alkyl amines, cyclic amines, hydantoin derivatives, amideamine, esteramide, quaternary ammonium salts, heterocylic compounds such as pyridine, phosphonium or sulfonium, etc., anionic surface active agents containing acidic groups such as carboxylic acid, sulfonic acid, phosphonic acid, phosphoric acid, sulfuric acid ester group, phosphonic acid ester, phosphoric acid ester, etc., or ampholytic surface active agents such as amino acids, amino-sulfonic acids, sulfuric acid or phosphoric acid esters of amino alcohol, alkylbetaine type surface active agent, etc. These surface active agents may be added alone or in combination. These surface active agents are used in the magnetic recording medium in the range of 0.01 to 1 weight parts to 100 weight parts of ferromagnetic powder. In the back coating layer, these are used in the range of 0.01 to 30 weight parts to 100 weight parts of the binder. These are used as antistatic agents, while these may be used for other purposes such as improvement of dispersion and magnetic characteristics, improvement of lubricating property, or as coating aid, moistening agent, curing promoting agent, or dispersion promoting agent.

The magnetic layer can be formed according to ordinary method. For example, the components for the magnetic layer including ferromagnetic powder, resin components, and abrasive agents and curing agents to be blended as necessary are kneaded and dispersed with solvent, and magnetic coating material is prepared, and this magnetic coating material is coated on a non-magnetic support member. As organic solvents to be used in the course of kneading and coating, the following compounds may be used at an arbitrary ratio: ketone type compounds such as acetone, methylethylketone, methylisobutylketone, cyclohexanone, isophorone, tetrahydrofuran, etc., alcohol type compounds such as methanol, ethanol, propanol, butanol, isobutyl alcohol, isopropyl alcohol, methylcyclohexanol, etc., ester type compounds such as methyl acetate, ethyl acetate, butyl acetate, isobutyl acetate, isopropyl acetate, ethyl lactate, acetic acid glycol monoethyl ether, etc., ether type compounds such as diethyl ether, tetrahydrofuran, glycol dimethyl ether, glycol monoethyl ether, dioxane, etc., tar type compounds (aromatic hydrocarbon) such as benzene, toluene, xylene, cresol, chlorobenzene, styrene, etc., chlorinated hydrocarbons such as methylene chloride, ethylene chloride, carbon tetrachloride, chloroform, ethylene chlorohydrin, dichlorobenzene, etc., N,N-dimethylformaldehyde, hexane, etc. are used. Normally, two types or more of these solvents are used at an arbitrary ratio. These substances may contain impurities in small quantity (polymerized products of the solvent itself, water, raw material components, etc.) in less than 1 weight %. These solvents are used in the range of 100 to 20,000 weight parts to 100 weight parts of total solid matters, which include coating materials for the magnetic layer or the backing layer, undercoating solution, etc. The ratio of the solid matters in the coating materials for the magnetic layer is preferably 10 to 40 weight %. For the backing layer coating materials, the ratio of the solid matters is preferably 5 to 20 weight %. Instead of organic solvent, aqueous solvent (i.e. solvent containing water, or organic solvent compatible with water such as alcohol, acetone, etc. and having water as main component) may also be used.

There is no special restriction on the method of dispersion and kneading, and the procedure to add each component (such as resin, powder, lubricant, solvent, etc.), position of adding during dispersion or kneading, dispersion temperature (0 to 80° C.), etc. may be adequately set. To prepare the coating materials for the magnetic layer and the backing layer, normal type kneading device may be used. For example, 2-roll mill, 3-roll mill, ball mill, pebble mill, tron mill, sand grinder, Szegvari, attriter, high-speed impeller, disperser, high-speed stone mill, high-speed impact mill, disperser-kneader, high-speed mixer, ribbon blender, cokneader, intensive mixer, tumbler, blender, disperser, homogenizer, single-shaft screw extruder, two-shaft screw extruder, and ultrasonic disperser, etc. may be used. For normal dispersion or kneading, two or more of these dispersers or kneaders are used for continuous processing.

To coat the magnetic coating materials and the coating material for the back coating layer on the support member, viscosity of the coating solution is set to 1 to 20,000 cSt (25° C.), and coating may be performed by air doctor coat, blade coat, air knife coat, squeeze coat, impregnation coat, reverse roll coat, transfer roll coat, gravure coat, kiss coat, cast coat, spray coat, rod coat, normal rotation roll coat, curtain coat, bar coat, extrusion coat, spin coat, etc. or other method may be applied.

The sequence of coating of these coating solutions may be selected as desired. Prior to the coating of the desired coating solution, corona discharge may be carried out to improve adhesion between the undercoating layer or the support member. In case it is wanted to have the magnetic layer or the back coating layer in multiple layers, simultaneous multi-layer coating or sequential multi-layer coating may be performed.

When the magnetic coating material has been coated on the support member in the thickness of about 1 to 200 μm by the methods as described above, the ferromagnetic powder in the layer is dried in multiple stages at 20° C. to 130° C. as necessary, and the powder is oriented in desired direction (such as vertical, longitudinal, lateral, random or diagonal directions) at 500 to 5,000 G. This is called magnetic field orientation processing. Then, the magnetic layer thus formed is dried to have the thickness of 0.1 to 30 μm.

After drying process has been completed as described above, calender processing is performed on the coating layer as necessary. For the calender processing, super-calender rolls are used, for example. By the calender processing, pores produced at the removal of solvent during drying operation are decreased, and filling ratio of the ferromagnetic powder in the magnetic layer is improved. Thus, a magnetic recording medium having high electromagnetic transfer characteristics can be obtained.

In the stage after the above calender processing, if curing agent is used as the component of the binder, more than 90 weight % of the curing agent in the magnetic layer is still contained in the magnetic layer in non-reacted state. Thus, it is preferable that curing is performed to allow at least 50 weight % of the curing agent to react (or more preferably 80 weight % or more) before the subsequent processing. As curing methods, there are thermal curing method and electron beam curing method, and any of these methods may be applied in the present invention. By the curing procedure, the non-reacted curing agent contained in the magnetic layer after calender procedure is allowed to react, for example, with vinyl chloride type copolymer or resin component such as polyurethane resin and forms 3-dimensional net-like crosslinking structure. The thermal processing procedure is already known in the art, and thermal processing can be carried out in the present invention in accordance with the method already known. For example, heating temperature is usually set to 40° C. or higher (or more preferably within the range of 50 to 80° C. and heating duration is usually set to 20 hours or more (or more preferably between 24 hours and 7 days). The curing procedure by electron beam radiation is also known in the art, and curing procedure can be performed in the present invention in accordance with the methods already known.

In the present invention, the magnetic recording medium prepared as described above is cut using a cutter such as slitter to the desired dimension and it is wound up on plastic or metal reel. In the present invention, prior to the winding on reel or in the preceding stage, varnishing may be performed using polishing tape on the magnetic recording medium (magnetic layer, backing layer, edge end surface, base surface) on the surface of the magnetic layer or on the surface of the magnetic layer and the backing layer.

In the following, detailed description will be given on the present invention in connection with the examples. In the examples and the comparative examples, the term "part(s)" means "weight part(s)".

EXAMPLE A1

Preparation of magnetic coating solution for the upper layer

| | |
|---|---|
| Ferromagnetic alloy powder | 100 parts |
| Composition: Fe/Zn/Ni = 92/4/4 | |
| Hc: 2,000 Oe Crystallite size: 15 nm | |
| BET specific surface area: 59 m$^2$/g | |
| Longer axis dia.: 0.12 μm; Acicular ratio: 7 | |
| δs: 140 emu/g | |
| Polyurethane resin | 10 parts |
| (UR8200: manufactured by Toyobo Co., Ltd.; | |
| polyurethane resin containing polar group) | |
| Vinyl chloride resin | 8 parts |
| (MR110: manufactured by Nippon Zeon Co., Ltd.; | |
| vinyl chloride resin containing polar group) | |
| α-Al$_2$O$_3$ (particle size: 0.3 μm) | 2 parts |
| Carbon black (particle size: 40 nm) | 2 Parts |
| Cyclohexanone | 110 parts |
| Methylethylketone | 100 parts |
| Toluene | 100 parts |
| Butyl stearate | 2 parts |
| Stearic acid | 1 parts |

| | |
|---|---|
| Non-magnetic inorganic powder | 85 parts |
| α-iron oxide; longer axis; 0.12 μm | |
| Acicular ratio: 7; BET specific surface area: 55 m$^2$/g | |
| pH: 6.5 | |
| Polyurethane resin | 10 parts |
| (UR8200: manufactured by Toyobo Co., Ltd.; | |
| polyurethane resin containing polar group) | |
| Vinyl chloride resin | 8 parts |
| (MR110: manufactured by Nippon Zeon Co., Ltd.; | |
| vinyl chloride resin containing polar group) | |
| Cyclohexanone | 140 parts |
| Methylethylketone | 170 parts |
| Butyl stearate | 2 parts |
| Stearic acid | 1 parts |

For each of the magnetic coating material composition for the upper layer and the non-magnetic coating material composition for the lower layer, the components were kneaded for 60 minutes in an open kneader, and this was dispersed for 120 minutes in a sand mill. To the dispersion solution thus prepared, 6 parts of 3-functional polyisocyanate component with low molecular weight (Nippon Polyurethane; Coronate 3041) was added, and after stirring up and mixing for 20 minutes, the mixture was filtered through a filter having average pore size of 1 μm, and the magnetic coating material and the non-magnetic coating material were prepared.

A copolymer (A) was prepared by condensation polymerization of a mixing material which contains adipic acid salt of 1-(2-aminoethyl)-piperazine and caprolactam at copolymerization ratio of 90/10, and this was dissolved in methanol to have solid matter content of 2 weight % and was coated on a support member of aromatic polyamide with thickness of 4.5 μm as undercoating layer so that the thickness will be 0.1 μm when dried.

Further, the above non-magnetic coating material was coated to have the thickness after drying of 1.8 μm. Immediately thereafter, the magnetic coating material was coated by simultaneous multi-layer coating so that the thickness after drying was to be 0.2 μm. With both layers still not dried, magnetic field orientation was performed using a magnet of 3,000 gauss. After further drying, surface smoothening procedure was performed at the rate of 100 m/min., linear pressure of 300 kg/cm, and temperature of 90° C. using 7-stage calenders comprising only metal rolls. Then, thermal curing procedure was performed for 24 hours at 70° C., and the product was cut to have width of 3.8 mm, and a magnetic tape was produced.

The properties of the magnetic tape thus prepared were determined by the evaluation methods given below. The results are summarized in Table 1.

EXAMPLE A2

A magnetic tape of Example 2 was prepared by the same procedure as in Example 1 except that copolymerization ratio of the copolymer (A) of the resin used for the undercoating layer was changed to the copolymer (B) with copolymerization ratio of 70/30.

The properties of the magnetic tape thus prepared were determined by the same procedure as in Example 1. The results are summarized in Table 1.

EXAMPLE A3

A magnetic tape of Example 3 was prepared by the same procedure as in Example 1 except that the copolymer (A) of the resin to be used in the undercoating layer was changed to a copolymer (C) with copolymerization ratio of 50/50.

The properties of the magnetic tape thus prepared were determined by the same procedure as in Example 1. The results are summarized in Table 1.

COMPARATIVE EXAMPLE A1

A magnetic tape of the Comparative example 1 was prepared by the same procedure as in Example 1 except that the resin used in the undercoating layer was changed to RV240 (copolymerized polyester manufactured by Toyobo Co., Ltd.; trade name: Vylon).

The properties of the magnetic tape thus prepared were determined by the same procedure as in Example 1. The results are summarized in Table 1.

Comparative Example A2

A magnetic tape of Comparative example 2 was prepared by the same procedure as in Example 1 except that the resin used in the undercoating layer was changed to a copolymer (D), i.e. polyamide resin obtained by copolymerization of a compound (which comprises adipic acid and hexamethylenediamine at a ratio of 1/1 (molar ratio)) and caprolactam at a ratio of 6/4 (molar ratio).

The properties of the magnetic tape thus prepared were determined by the same procedure as in Example 1. The results are summarized in Table 1.

TABLE 1

| | Undercoating material | | | | | | |
|---|---|---|---|---|---|---|---|
| | Resin type | Solubility in solvent for upper layer | Adhesion (g/mm) | Surface roughness (nm) | Output (dB) | Output decrease (dB) | Dropouts (number) |
| Example A1 | Copolymer A | Insoluble | 65 | 2.8 | 2.2 | −0.2 | 5 |
| Example A2 | Copolymer B | Insoluble | 60 | 2.9 | 2.3 | −0.3 | 2 |
| Example A3 | Copolymer C | Insoluble | 55 | 3.0 | 2.3 | −0.3 | 4 |
| Comparative example A1 | RV240 | Soluble | 10 | 3.6 | −1.0 | −1.0 | 70 |
| Comparative example A2 | Copolymer D | Insoluble | 20 | 3.0 | 0.2 | −1.3 | 65 |

EXAMPLE B1

Preparation of single layer magnetic recording medium

Preparation of magnetic coating solution

| | |
|---|---|
| Ferromagnetic alloy powder | 100 parts |
| Composition: Fe/Zn/Ni = 92/4/4 | |
| Hc: 2,000 Oe Crystallite: 15 nm | |
| BET specific surface area: 59 m$^2$/g | |
| Longer axis dia.: 0.12 μm; Acicular ratio: 7 | |
| δs: 140 emu/g | |
| Polyurethane resin | 10 parts |
| (UR8200: manufactured by Toyobo Co., Ltd.; | |
| Polyurethane resin containing polar group) | |
| Vinyl chloride resin | 6 parts |
| (MR110: manufactured by Nippon Zeon Co., Ltd.; | |
| Vinyl chloride resin containing polar group) | |
| α-Al$_2$O$_3$ (particle size: 0.3 μm) | 2 parts |

| | |
|---|---|
| Carbon black (particle size: 40 nm) | 2 Parts |
| Cyclohexanone | 110 parts |
| Methylethylketone | 100 parts |
| Toluene | 100 parts |
| Butyl stearate | 2 parts |
| Stearic acid | 1 parts |

After the components of the magnetic coating material were kneaded for 60 minutes in an open kneader, and this was dispersed for 120 minutes in a sand mill. To the dispersion solution thus prepared, 6 parts of 3-functional polyisocyanate component with low molecular weight (Nippon Polyurethane; Coronate 3041) was added, and after stirring up and mixing for 20 minutes, the mixture was filtered through a filter having average pore size of 1 μm, and magnetic coating solution were prepared.

A copolymer (A) was prepared by condensation polymerization of a mixing material which contains adipic acid salt of 1-(2-aminoethyl)-piperazine and caprolactam at copolymerization ratio of 90/10, and this was dissolved in methanol to have solid matter content of 2 weight % and was coated on a support member of aromatic polyamide with thickness of 4.5 μm as undercoating layer so that the thickness will be 0.1 μm when dried.

Further, the above magnetic coating material was coated to have the thickness after drying of 2.0 μm, and magnetic field orientation was performed using a magnet of 3000 gauss while the magnetic layer was not yet dried. After further drying, surface smoothening procedure was performed at the rate of 100 m/min., linear pressure of 300 kg/cm, and temperature of 90° C. using 7-stage calenders comprising only metal rolls. Then, thermal curing procedure was performed for 24 hours at 70° C., and the product was cut to have width of 3.8 mm, and a magnetic tape was produced.

The properties of the magnetic tape thus prepared were determined by the evaluation methods given below. The results are summarized in Table 2.

EXAMPLE B2

A magnetic tape of Example B2 was prepare by the same procedure as in Example B1 except that the resin to be used in the undercoating layer was changed to a copolymer (B), which was obtained by condensation polymerization of a mixed raw material containing adipic acid salt of 2-aminoethyl piperazine and caprolactam at copolymerization ratio of 80/20.

The properties of the magnetic tape thus prepared were determined by the same procedure as in Example B1. The results are summarized in Table 2.

EXAMPLE B3

Preparation of magnetic coating solution for the upper layer

| | |
|---|---|
| Ferromagnetic alloy powder | 100 parts |
| Composition: Fe/Zn/Ni = 92/4/4 | |
| Hc: 2,000 Oe; Crystallite: 15 nm | |
| BET specific surface area: 59 m²/g | |
| Longer axis dia.: 0.12 μm; Acicular ratio: 7 | |

| | |
|---|---|
| δs: 140 emu/g | |
| Polyurethane resin | 12 parts |
| (UR8200: manufactured by Toyobo Co., Ltd.; | |
| Polyurethane resin containing polar group) | |
| Vinyl chloride resin | 6 parts |
| (MR110: manufactured by Nippon Zeon Co., Ltd.; | |
| Vinyl chloride resin containing polar group) | |
| α-Al₂O₃ (particle size: 0.3 μm) | 2 parts |
| Carbon black (particle size: 40 nm) | 2 Parts |
| Cyclohexanone | 110 parts |
| Methylethylketone | 100 parts |
| Toluene | 100 parts |
| Butyl stearate | 2 parts |
| Stearic acid | 1 parts |

(Preparation of non-magnetic coating solution for the lower layer)

| | |
|---|---|
| Non-magnetic inorganic powder | 85 parts |
| α-iron oxide; longer axis: 0.12 μm | |
| Acicular ratio: 7 | |
| BET specific surface area: 55 m²/g; pH 6.5 | |
| Polyurethane resin | 10 parts |
| (UR8200; manufactured by Toyobo Co., Ltd.; | |
| Polyurethane resin containing polar group) | |
| Vinyl chloride resin | 8 parts |
| (MR110: manufactured by Nippon Zeon Co., Ltd.; | |
| Vinyl chloride resin containing polar group) | |
| Cyclohexanone | 140 parts |
| Methylethylketone | 170 parts |
| Butyl stearate | 2 parts |
| Stearic acid | 1 parts |

For each of the magnetic coating material for the upper layer and the non-magnetic coating material for the lower layer, the components were kneaded for 60 minutes in an open kneader, and this was dispersed for 120 minutes in a sand mill. To the dispersion solution thus prepared, 6 parts of 3-functional polyisocyanate component with low molecular weight (Nippon Polyurethane; Coronate 3041) was added, and after stirring up and mixing for 20 minutes, the mixture was filtered through a filter having average pore size of 1 μm, and the magnetic coating material and the non-magnetic coating material were prepared.

The copolymer (A) used in Example 1 was dissolved in methanol to have solid matter content of 2 weight % and this was coated on the support member of aromatic polyamide with thickness of 4.5 μm as undercoating layer so that the thickness after drying was to be 0.1 μm.

Further, the above non-magnetic coating material was coated to have the thickness after drying of 1.8 μm. Immediately thereafter, the magnetic coating material was coated by simultaneous multi-layer coating so that the thickness after drying was to be 0.2 μm. With both layers still not dried, magnetic field orientation was performed using a magnet of 3,000 gauss. After further drying, surface smoothening procedure was performed at the rate of 100 m/min., linear pressure of 300 kg/cm, and temperature of 90° C. using 7-stage calenders comprising only metal rolls. Then, thermal curing procedure was performed for 24 hours at 70° C., and the product was cut to have width of 3.8 mm, and a magnetic tape was produced.

The properties of the magnetic tape thus prepared were determined by the same procedure as in Example B1. The results are summarized in Table 2.

EXAMPLE B4

A magnetic tape of Example B4 was prepared by the same procedure as in Example B3 except that the resin to be used in the undercoating layer was changed to a copolymer (B).

The properties of the magnetic tape thus prepared were determined by the same procedure as in Example B1. The results are summarized in Table 2.

Comparative Example B1

A magnetic tape of Comparative example B1 was prepared by the same procedure as in Example B1 except that the resin used in the undercoating layer was changed to RV240 (copolymerized polyester manufactured by Toyobo Co., Ltd.; trade name: Vylon).

polyamide resin (D), which was obtained by copolymerization of a compound (comprising adipic acid and hexamethylenediamine at a ratio of 1/1 (molar ratio)) with caprolactam at a ratio of 6/4 (molar ratio).

The properties of the magnetic tape thus prepared were determined by the same procedure as in Example B1. The results are summarized in Table 2.

TABLE 2

| | Undercoating material | | Adhesion (g/mm) | Surface roughness (nm) | Output (dB) | Output decrease (dB) | Dropouts (number) |
|---|---|---|---|---|---|---|---|
| | Resin type | Solubility in solvent for upper layer | | | | | |
| Example B1 | Copolymer A | Insoluble | 60 | 4.0 | 0.3 | −0.3 | 1 |
| Example B2 | Copolymer B | Insoluble | 50 | 4.2 | 0.2 | −0.2 | 5 |
| Example B3 | Copolymer A | Insoluble | 65 | 2.8 | 2.2 | −0.2 | 5 |
| Example B4 | Copolymer B | Insoluble | 60 | 2.9 | 2.3 | −0.3 | 2 |
| Comparative example B1 | RV240 | Soluble | 10 | 4.6 | −0.8 | −1.3 | 70 |
| Comparative example B2 | Copolymer C | Insoluble | 20 | 4.0 | 0.3 | −1.3 | 60 |
| Comparative example B3 | RV240 | Soluble | 15 | 3.5 | 1.9 | −1.2 | 65 |
| Comparative example B4 | Copolymer D | Insoluble | 25 | 3.0 | 2.0 | −1.3 | 55 |

The properties of the magnetic tape thus prepared were determined by the same procedure as in Example B1. The results are summarized in Table 2.

Comparative Example B2

A magnetic tape of Comparative example B2 was prepared by the same procedure as in Example B1 except that the resin used in the undercoating layer was changed to a copolymer (C), which was obtained by condensation polymerization of a mixed raw material containing adipic acid salt of 2-aminoethyl piperazine and caprolactam in copolymerization ratio of 70/30.

The properties of the magnetic tape thus prepared were determined by the same procedure as in Example B1. The results are summarized in Table 2.

Comparative Example B3

A magnetic tape of Comparative example B3 was prepared by the same procedure as in Example B3 except that the resin used in the undercoating layer was changed to RV240 (copolymerized polyester manufactured by Toyobo Co., Ltd.; trade name: Vylon).

The properties of the magnetic tape thus prepared were determined by the same procedure as in Example B1. The results are summarized in Table 2.

Comparative Example B4

A magnetic tape of Comparative example B4 was prepared by the same procedure as in Example B3 except that the resin used in the undercoating layer was replaced by a Evaluation Methods (1) Adhesion A part of the magnetic tape cut to 3.8 mm in width was attached on a mount using double-sided adhesive tape. One end of the magnetic tape was pulled in the same direction as the other end, and peel strength was determined under the conditions of 23° C. and 50% relative humidity.

(2) Surface roughness of the magnetic layer This was expressed by average roughness along central line, obtained by optical interference method using digital optical profile meter (manufactured by WYKO).

(3) Electromagnetic transfer characteristics Output: On the magnetic tape used as specimen, a signal of 4.7 MHz in frequency was recorded under the conditions of 23° C. and 50% relative humidity and this signal was reproduced. The output at the first reproduction was evaluated by relative output compared with the result using the tape of Example 1.

Output decrease: After the output at the first reproduction was determined, repeated running operation was performed by 1,000 times, and the output was continuously reproduced. Using the output of the first reproduction of each specimen as 0 dB, the output after 1,000 operations was determined, and this was expressed as output decrease.

(4) Dropout

On the magnetic tape used as specimen, a signal of 2.35 MHz in frequency was recorded under the conditions of 23° C. and 50% relative humidity, and this was reproduced. The number of dropouts, defined as 15 μs or more in length with output decrease of −16 dB or more, was determined, and the rate of increase after 100-pass running was expressed as DO with the value of 1 pass running as reference.

The present invention provides a magnetic recording medium, which comprises a magnetic layer having ferromagnetic powder dispersed in a binder, and the magnetic layer is placed at least on one side of a non-magnetic support member, or a non-magnetic coating layer having non-magnetic powder dispersed in a binder is provided, and a magnetic layer having ferromagnetic powder dispersed in a binder is placed on it. When the non-magnetic support member of the magnetic recording medium is made of aromatic polyamide, an undercoating layer comprising polyamide resin having a specific repeated structural unit and not soluble in a solvent used in the magnetic layer or the non-magnetic layer is provided between the non-magnetic support member and the magnetic layer or the non-magnetic layer. This makes it possible to improve adhesion between the non-magnetic support member and the magnetic layer or the non-magnetic coating layer, to prevent dropping of the coating layer, and to decrease the occurrence of dropouts. Further, it is possible to provide a magnetic recording medium, which has high running durability, good surface smoothness, and to provide high output. Thus, remarkable effects can be attained by the present invention compared with the conventional method.

What is claimed is:

1. A magnetic recording medium, comprising a support and a non-magnetic coating layer containing non-magnetic powder and binder, and a magnetic layer containing ferromagnetic powder and a binder, whereby said support is made of aromatic polyamide, said binder in said non-magnetic layer comprises a material containing at least one group selected from the group consisting of —SO$_3$M, —OSO$_3$M$_2$, —PO$_3$M$_2$, and —OPO$_3$M$_2$, and an undercoating layer comprising polyamide having one or more tertiary amino groups is provided between said support and said non-magnetic layer, wherein said polyamide resin having one or more tertiary amino groups is a copolymerized polyamide having repeated structural units expressed by the following formulae (1) and (2):

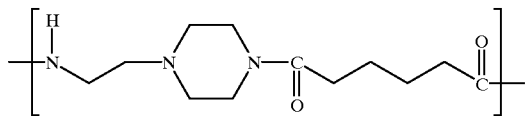
(1)

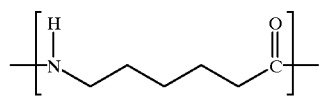
(2)

2. A magnetic recording medium according to claim 1, wherein said polyamide having one or more tertiary amino groups is not soluble in a solvent used in the non-magnetic layer coated after the coating of the undercoating layer.

3. A magnetic recording medium according to claim 1, wherein said polyamide resin having one or more tertiary amino groups has a glass transition temperature (Tg) of not lower than 15° C.

4. A magnetic recording medium according to claim 1, wherein said undercoating layer is 0.03 to 1.0 μm in thickness.

5. A magnetic recording medium, comprising a support and a magnetic layer containing ferromagnetic powder and a binder, or a support and a non-magnetic coating layer containing non-magnetic powder and a binder and a magnetic layer containing ferromagnetic powder and a binder, whereby said support is made of aromatic polyamide, an undercoating layer is provided between said support and the non-magnetic layer, or in case when the non-magnetic layer is not present, between the support and the magnetic layer, said undercoating layer comprising polyamide resin having one or more tertiary amino groups and containing repeated structural units expressed by the following formulae (1) and (2) in a copolymerization ratio (molar ratio) of 75/25 to 95/5

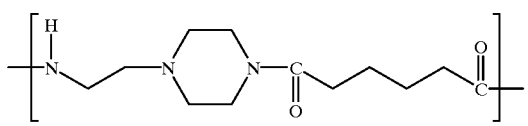
(1)

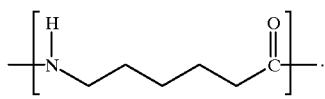
(2)

6. A magnetic recording medium according to claim 5, wherein said polyamide resin having one or more tertiary amino groups is not soluble in a solvent used in the non-magnetic layer.

7. A magnetic recording medium according to claim 5, wherein said polyamide resin having one or more tertiary amino groups has a glass transition temperature (Tg) of not lower than 15° C.

8. A magnetic recording medium according to claim 5, wherein said undercoating layer is 0.03 to 1.0 μm in thickness.

9. A magnetic recording medium according to claim 1 or 5, wherein said ferromagnetic powder is needle-like ferromagnetic metal powder having a longer axis length of 0.05 to 0.5 μm and a ratio of longer axis to shorter axis of 2/1 to 25/1.

10. A magnetic recording medium according to claim 1 or 5, wherein said ferromagnetic powder has a specific surface area ($S_{BET}$) of 47 to 80 m$^2$/g and saturation magnetization ($\sigma_s$) of 100 to 180 emu/g.

11. A magnetic recording medium according to claim 1 or 5, wherein said ferromagnetic powder has a coercive force (Hc) of 1250 to 2500 Oe.

* * * * *